(12) United States Patent
Marriott et al.

(10) Patent No.: US 6,773,354 B2
(45) Date of Patent: Aug. 10, 2004

(54) DRIVESHAFT ASSEMBLY THAT IS BALANCED FOR ROTATION AND METHOD OF MANUFACTURING SAME

(75) Inventors: Thomas J. Marriott, Temperance, MI (US); Norman L. Bowser, Toledo, OH (US); Daniel C. Perry, Temperance, MI (US); Kevin E. Niebel, Toledo, OH (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 10/229,960

(22) Filed: Aug. 28, 2002

(65) Prior Publication Data

US 2003/0050128 A1 Mar. 13, 2003

Related U.S. Application Data

(60) Provisional application No. 60/316,520, filed on Aug. 31, 2001.

(51) Int. Cl.[7] .................................................. F16D 3/16
(52) U.S. Cl. ....................................... 464/127; 464/180
(58) Field of Search ................................. 464/180, 127; 188/378; 74/573 R

(56) References Cited

U.S. PATENT DOCUMENTS

| | | |
|---|---|---|
| 1,645,323 A | 10/1927 | Griswold |
| 3,940,948 A | 3/1976 | Schultenkamper |
| 4,170,896 A | 10/1979 | Korkosz |
| 4,887,989 A | 12/1989 | Kerecman |
| 4,895,551 A | 1/1990 | Fritz |
| 4,952,195 A | 8/1990 | Traylor |
| 5,234,378 A | 8/1993 | Helgesen et al. |
| 5,326,325 A | 7/1994 | Oetiker |
| 5,634,853 A | * 6/1997 | Smith .......................... 464/162 |
| 5,767,403 A | 6/1998 | Kopp et al. |
| 6,287,208 B1 | 9/2001 | Faulkenberry et al. |
| 6,463,827 B1 | * 10/2002 | Oetiker ..................... 74/573 R |
| 6,558,262 B1 | * 5/2003 | Breidenbach et al. ....... 464/175 |
| 6,619,119 B1 | * 9/2003 | Duggan et al. ........... 74/573 R |

FOREIGN PATENT DOCUMENTS

| | | | |
|---|---|---|---|
| DE | 4313296 | | 6/1994 |
| EP | 385176 | | 9/1990 |
| GB | 2090942 A | * | 6/1982 |
| GB | 2238846 | | 6/1991 |
| JP | 60211115 | | 10/1985 |
| JP | 10274289 | | 10/1998 |

* cited by examiner

*Primary Examiner*—Anthony Knight
*Assistant Examiner*—Aaron Dunwoody
(74) *Attorney, Agent, or Firm*—MacMillan, Sobanski & Todd, LLC

(57) ABSTRACT

A driveshaft assembly is balanced for rotation during use by initially disposing an annular band about a portion thereof. The band is then secured to the driveshaft assembly, such as by welding, adhesives, frictional engagement, and the like. After the band is secured to the driveshaft assembly, one or more balance weights can be secured to the band, such as by welding, adhesives, and the like, at desired locations to balance the driveshaft assembly for rotation. The band functions as a mounting surface upon which the balance weights can be secured to balance the driveshaft assembly for rotation. Because the balance weights are secured not directly to the driveshaft assembly, but rather are mounted indirectly thereon by the band, the driveshaft assembly is protected from damage that might otherwise result from welding the balance weights directly thereto. The method is particularly useful when a portion of the driveshaft assembly has a relatively small wall thickness or is formed from a material having a relatively low melting temperature.

10 Claims, 3 Drawing Sheets

DRIVESHAFT ASSEMBLY THAT IS BALANCED FOR ROTATION AND METHOD OF MANUFACTURING SAME

CROSS REFERENCE TO RELATED APPLICATION

This application claims the benefit of U.S. Provisional Application No. 60/316,520, filed Aug. 31, 2001, the disclosure of which is incorporated herein by reference.

BACKGROUND OF THE INVENTION

This invention relates in general to drive train systems for transferring rotational power from a source to a driven mechanism, such as from a vehicular engine/transmission assembly to an axle assembly. In particular, this invention relates to an improved structure for a driveshaft assembly for use in such a drive train system that is balanced for rotation during use, and to a method of manufacturing same.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft tube to the input shaft of the axle assembly, while accommodating a limited amount of angular misalignment between the rotational axes of these three shafts.

Ideally, the driveshaft tube would be formed in the shape of a cylinder that is absolutely round, absolutely straight, and has an absolutely uniform wall thickness. Such a perfectly shaped driveshaft tube would be precisely balanced for rotation and, therefore, would not generate any undesirable noise or vibration during use. In actual practice, however, the driveshaft tube and other components of the driveshaft assembly usually contain variations in roundness, straightness, and wall thickness that result in minor imbalances when rotated at high speeds. To prevent such imbalances from generating undesirable noise or vibration when rotated during use, therefore, it is commonplace to counteract such imbalances by securing balance weights to selected portions of the driveshaft tube or other components of the driveshaft assembly. The balance weights are sized and positioned to counterbalance the imbalances of the driveshaft assembly such that it is balanced for rotation during use.

Traditionally, the balancing process has been performed with the use of a conventional balancing machine. A typical balancing machine includes a pair of fittings that are adapted to support the ends of the driveshaft assembly thereon. The balancing machine further includes a motor for rotating the driveshaft assembly at a predetermined speed. As the driveshaft assembly is rotated, the balancing machine senses vibrations that are caused by imbalances in the structure of the driveshaft assembly. The balancing machine is responsive to such vibrations for determining the size and location of one or more balance weights that, if secured to the driveshaft assembly, will minimize these imbalances. The rotation of the driveshaft assembly is then stopped to allow such balance weights to be secured to the outer surface of the driveshaft tube or other components of the driveshaft assembly in a conventional manner, such as by welding, adhesives, and the like. The driveshaft assembly is again rotated to confirm whether proper balance has been achieved or to determine if additional balance weights are required. A number of such balancing machines of this general structure and method of operation are known in the art.

In the past, vehicular driveshaft tubes have been formed from steel alloys or other metallic materials having relatively large wall thicknesses and having relatively high melting temperatures. In such driveshaft tubes, conventional welding processes have been commonly used to secure the balance weights directly thereto. Because of the relatively large wall thicknesses and relatively high melting temperatures of such driveshaft tubes, the heat generated during the welding process does not adversely distort the shape or affect the torque-transmitting capacity thereof in a significant manner. However, in some instances, it is desirable to form the driveshaft tubes having relatively small wall thicknesses or from materials having relatively low melting temperatures. For example, in racing vehicles, it may be desirable to minimize the wall thickness of the driveshaft tube to reduce weight. Also, it may be desirable to form the driveshaft tubes from aluminum alloys and other relatively lightweight metallic materials that have relatively low melting temperatures. The use of conventional welding processes to secure the balance weights directly to the driveshaft tubes in either of these instances is somewhat more difficult because the heat generated during the welding process may undesirably distort the shape or affect the torque-transmitting capacity thereof in a significant manner. Thus, it would be desirable to provide an improved structure for a driveshaft assembly for use in a drive train system that is balanced for rotation during use, and an improved method of manufacturing same, that avoids these problems.

SUMMARY OF THE INVENTION

This invention relates to an improved structure for a driveshaft assembly for use in a drive train system that is balanced for rotation during use, and to a method of manufacturing same. An annular band is disposed about a portion of the article and is secured thereto, such as by welding, adhesives, frictional engagement, and the like. After the band is secured to the article, one or more balance weights can be secured to the band at desired locations to balance the article for rotation. The balance weights can be secured to the band in any suitable manner, such as by welding, adhesives, and the like. The band functions as a mounting surface upon which the balance weights can be secured to balance the article for rotation. Because the balance weights are secured not directly to the article, but rather are mounted indirectly thereon by the band, the article is protected from damage that might otherwise result from welding the balance weights directly thereto.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
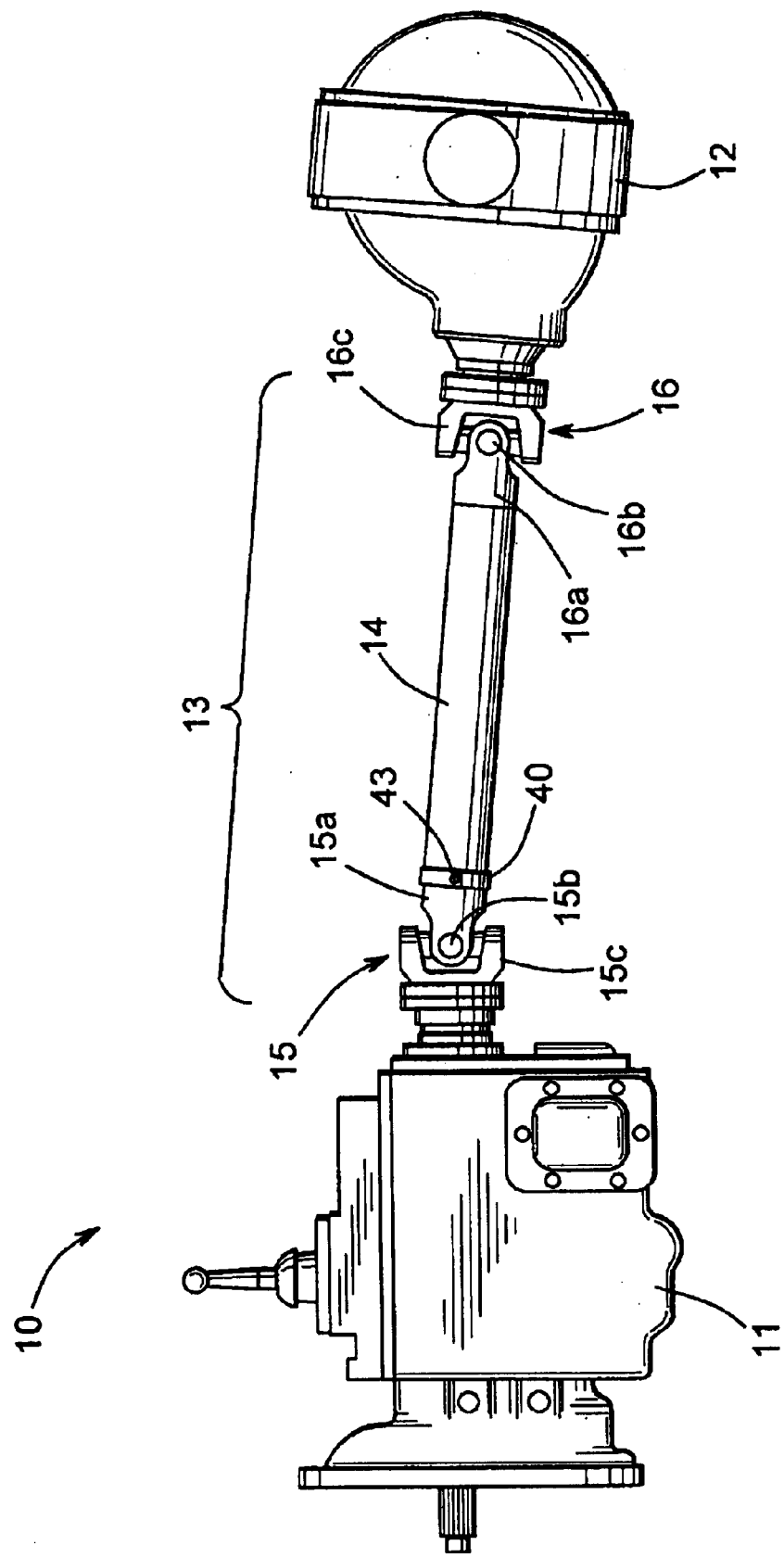
FIG. 1 is a side elevational view of a vehicle drive train system including a driveshaft assembly that has been rotationally balanced in accordance with a first embodiment of the method of this invention.

Referring now to the drawings, there is illustrated in FIG. 1 a drive train system, indicated generally at 10, for a vehicle that is adapted to transmit rotational power from an engine/transmission assembly 11 to a plurality of driven wheels (not shown). The illustrated drive train assembly 10 is, for the most part, conventional in the art and is intended merely to illustrate one environment in which this invention may be used. Thus, the scope of this invention is not intended to be limited for use with the specific structure for the vehicle drive train assembly 10 illustrated in FIG. 1 or to vehicle drive train assemblies in general. On the contrary, as will become apparent below, this invention may be used in any desired environment for the purposes described below.

The illustrated drive train system 10 includes a transmission 11 having an output shaft (not shown) that is connected to an input shaft (not shown) of an axle assembly 12 through a driveshaft assembly 13. The transmission 11 is rotatably driven by an engine (not shown) that generates rotational power in a conventional manner. The driveshaft assembly 13 includes a cylindrical driveshaft tube 14 having a center portion and a pair of opposed end portions. The output shaft of the transmission 11 and the input shaft of the axle assembly 12 are typically not co-axially aligned. To accommodate this, a pair of universal joints, indicated generally at 15 and 16, are provided to respectively connect the end portions of the driveshaft tube 14 to the output shaft of the transmission 11 and to the input shaft of the axle assembly 12. The first universal joint 15 includes a tube yoke 15a that is secured to the forward end portion of the driveshaft tube 14 by any conventional means, such as by welding. The first universal joint 15 further includes a cross 15b that is connected to the tube yoke 15a in a conventional manner. Lastly, the first universal joint 15 includes an end yoke 15c that is connected to the output shaft of the transmission 11 and to the cross 15b. Similarly, the second universal joint 16 includes a tube yoke 16a that is secured to the rearward end portion of the driveshaft tube 14 by any conventional means, such as by welding. The second universal joint 16 further includes a cross 16b that is connected to the tube yoke 16a in a conventional manner. Lastly, the second universal joint 16 includes an end yoke 16c that is connected to the cross 16b and to the input shaft of the axle assembly 12. The front and rear universal joints 15 and 16 provide a rotational driving connection from the output shaft of the transmission 11 through the driveshaft tube 14 to the input shaft of the axle assembly 12, while accommodating a limited amount of angular misalignment between the rotational axes of these three shafts.

Figure 2:
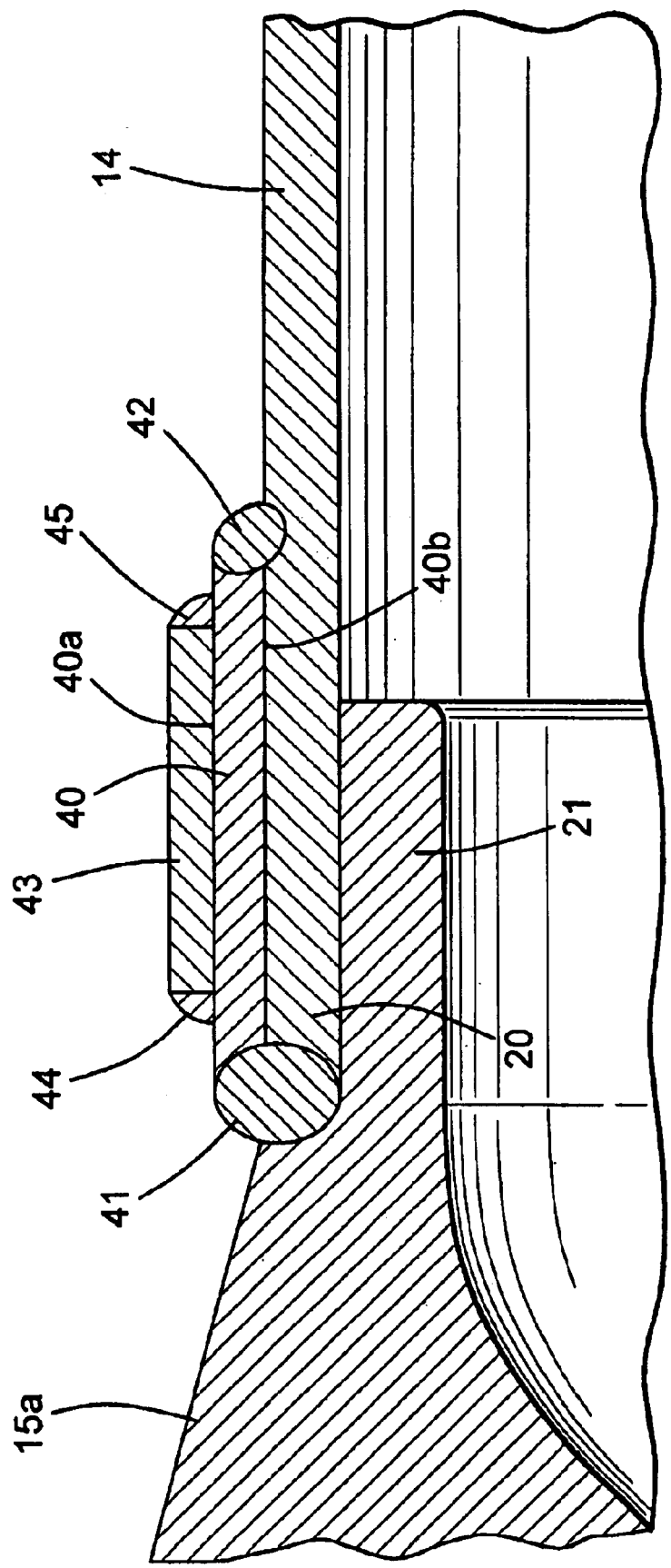
FIG. 2 is an enlarged sectional elevational view of a joint between a tube yoke and a first end of a driveshaft tube illustrated in FIG. 1 showing the first embodiment of the method of this invention.

FIG. 2 is an enlarged sectional elevational view of the joint between the tube yoke 15a and the driveshaft tube 14 illustrated in FIG. 1. As shown therein, the driveshaft tube 14 has an end portion 20 that is disposed telescopically about a sleeve portion 21 of the tube yoke 16. Typically, the sleeve portion 21 of the tube yoke 16 is somewhat reduced in diameter from the body portion thereof so as to define a shoulder (not shown) on the tube yoke 16. During assembly, the leading edge of the end portion 20 of the driveshaft tube 14 is moved telescopically about the sleeve portion 21 of the tube yoke 15a into abutment with the shoulder provided on the tube yoke 15a. In this manner, the driveshaft tube 13 and the tube yoke 15a are initially positively positioned relative to one another. However, the driveshaft tube 13 and the tube yoke 15a can be positioned relative to one another in any desired manner.

An annular band 40 is disposed about the end portion 20 of the driveshaft tube 14. Preferably, the band 40 is installed on the end portion 20 of the driveshaft tube 14 before the end portion 20 is moved telescopically about the sleeve portion 21 of the tube yoke 15a, as described above. Thus, the band 40 is installed on the sleeve portion 21 of the tube yoke 15a together with the end portion 20 of the driveshaft tube 14. The illustrated band 40 is hollow and cylindrical in shape, defining an outer surface 40a and an inner surface 40b. Preferably, the inner surface 40b of the band 40 defines an inner diameter that is approximately the same as an outer diameter defined by the end portion 20 of the driveshaft tube 14. As a result, the band 40 is frictionally retained on the end portion 20 of the driveshaft tube 14. This frictional engagement can facilitate the retention of the band 40 in a desired position on the end portion 20 of the driveshaft tube 14 during assembly with the tube yoke 15a. However, the band 40 may be formed having any desired size or shape and can be retained on the end portion 20 of the driveshaft tube 14 in any other manner, such as by adhesives. Alternatively, the band 40 need not be positively retained on the end portion 20 of the driveshaft tube 14 during assembly if desired. Furthermore, the band 40 need not extend completely about the end portion 20 of the driveshaft tube 14 as shown, but rather may extend only partially about such end portion 20 if desired.

As shown in FIG. 2, the tube yoke 15a, the driveshaft tube 14, and the band 40 are all secured together by a weld 41. Preferably, the tube yoke 15a, the driveshaft tube 14, and the band 40 are simultaneously secured together by the weld 41 that extends circumferentially about the entire periphery of the driveshaft assembly 13. However, the weld 41 need not extend completely about the tube yoke 15a, the driveshaft tube 14, and the band 40. Rather, the weld 41 may, if desired, be accomplished by one or more discrete spot welds. Alternatively, only the tube yoke 15a and the driveshaft tube 14 may be secured together by the weld 41, and the driveshaft tube 14 and the band 40 may, in turn, be secured together by a second weld 42 that is located remote from the first weld 41. Preferably, the tube yoke 15a, the driveshaft tube 14, and the band 40 are formed from similar materials to facilitate such welding, although such is not required.

The band 40 may, if desired, be secured to the tube yoke 15a and/or the driveshaft tube 14 by any other desired process as well, including adhesives, for example. Alternatively, the band 40 may be frictionally engaged with the driveshaft tube 14 as a result of the assembly of the tube yoke 15a with the driveshaft tube 14. For example, when the end portion 20 of the driveshaft tube 14 is moved telescopically about the sleeve portion 21 of the tube yoke 15a, the sleeve portion 21 of the tube yoke 15a may be sized to enlarge the end portion 20 of the driveshaft tube 14. Such enlargement can cause the end portion 20 of the driveshaft tube 14 to be expanded into frictional engagement with the band 40 to secure it in position.

After the band 40 is secured to the tube yoke 15a and/or the driveshaft tube 14, one or more balance weights 43 can be secured to the band 40 at desired locations to balance the tube yoke 15a and the driveshaft tube 14 for rotation. The balance weights 43 can be secured to the band 40 in any suitable manner, such as by one or more welds 44 and 45, adhesives, and the like. The balance weights 43 can be formed having any suitable shape and size for accomplishing this balancing function. Preferably, the band 40 and the balance weights 43 are formed from similar materials to facilitate such welding, although such is not required.

As discussed above, it is sometimes desirable to form the driveshaft tube 14 having relatively a small wall thickness or from a material having a relatively low melting temperature. The use of conventional welding processes to secure the balance weights 43 directly to the driveshaft tube 14 in either of these instances is somewhat more difficult because the heat generated during the welding process may undesirably distort the shape or affect the torque-transmitting capacity thereof in a significant manner. The band 40 of this invention functions as a mounting surface upon which the balance weights 43 can be secured to balance the tube yoke 15a and the driveshaft tube 14 for rotation. The band 40 is initially secured to the tube yoke 15a and/or the driveshaft tube 14 in such a manner as to avoid any adverse effect thereon. Because the balance weights 43 are secured not directly to the driveshaft tube 14 but rather are mounted indirectly thereon by the band 40, the driveshaft tube 14 is protected from damage that might otherwise result from directly welding the balance weights 43 thereto.

Figure 3:
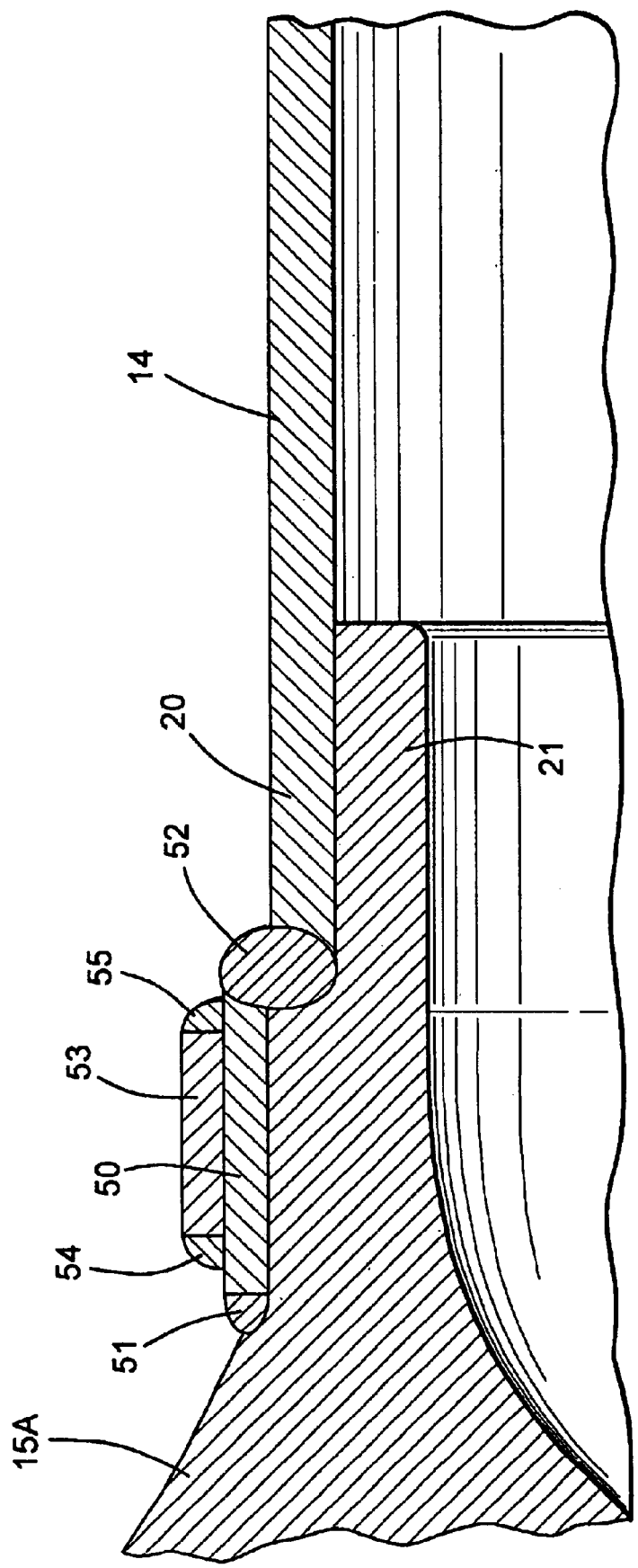
FIG. 3 is an enlarged sectional elevational view similar to FIG. 2 showing a second embodiment of the method of this invention.

FIG. 3 is an enlarged sectional elevational view of an alternative embodiment of the joint between the tube yoke 15a and the driveshaft tube 14 illustrated in FIG. 2. The driveshaft tube 14 and the tube yoke 15a are initially positioned relative to one another in the same manner as described above. An annular band 50 is disposed about a portion of the tube yoke 15a adjacent to the sleeve portion 21 thereof. Preferably, the band 50 is installed on the tube yoke 15a before the end portion 20 of the driveshaft tube 14 is moved telescopically about the sleeve portion 21 thereof, as described above. Thus, the band 50 can be retained on the tube yoke 15a in any desired manner, such as by a weld 51, adhesives, frictional engagement, and the like. Preferably, however, the tube yoke 15a, the driveshaft tube 14, and the band 50 are simultaneously secured together by a weld 52 that extends circumferentially about the entire periphery thereof, similar to the weld 41 described above. Then, one or more balance weights 53 can be secured to the band 50 in any suitable manner, such as by one or more welds 54 and 55, adhesives, and the like to balance the driveshaft assembly 10 for rotation.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A driveshaft assembly that is balanced for rotation comprising:

a driveshaft tube;

a tube yoke that is supported on said driveshaft tube;

a band extending about portions of said driveshaft tube and said tube yoke, said band including a first end that is welded to both said driveshaft tube and said tube yoke and a second end that is welded to one of said driveshaft tube and said tube yoke; and a balance weight secured to said band to provide a driveshaft assembly that is balanced for rotation.

2. The driveshaft assembly defined in claim 1 wherein said band extends completely about said portions of said driveshaft tube and said tube yoke.

3. The driveshaft assembly defined in claim 1 wherein said balance weight is secured to said band by one of welding, adhesives, and frictional engagement.

4. The driveshaft assembly defined in claim 1 wherein said second end that is welded to said driveshaft tube.

5. The driveshaft assembly defined in claim 1 wherein said second end that is welded to said tube yoke.

6. A method of manufacturing a driveshaft assembly that is balanced for rotation comprising the steps of:

(a) providing a driveshaft tube;

(b) providing a tube yoke that is supported on the driveshaft tube;

(c) providing a band about portions of the driveshaft tube and the tube yoke;

(d) welding a first end of the band to both the driveshaft tube and the tube yoke, and welding a second end of the band to one of the driveshaft tube and the tube yoke; and (e) securing a balance weight to the band to provide a driveshaft assembly that is balanced for rotation.

7. The method defined in claim 6 wherein said step (c) is performed by providing a band that extends completely about portions of the driveshaft tube and the tube yoke.

8. The method defined in claim 6 wherein said step (e) is performed by one of welding, adhesives, and frictional engagement.

9. The method defined in claim 6 wherein said step (d) is performed by welding the second end of the band to the driveshaft tube.

10. The method defined in claim 6 wherein said step (d) is performed by welding the second end of the band to the tube yoke.

* * * * *